United States Patent [19]
Gallo

[11] Patent Number: 5,761,992
[45] Date of Patent: Jun. 9, 1998

[54] PORTABLE ANIMAL STORAGE UNIT

[76] Inventor: Charles V. Gallo, 725 Davis St., Blacksburg, Va. 24060

[21] Appl. No.: 815,860

[22] Filed: Mar. 12, 1997

[51] Int. Cl.$^6$ ................. A23L 3/00; A23L 3/34
[52] U.S. Cl. ............... 99/468; 99/470; 99/476; 99/517; 119/497; 452/128; 452/187
[58] Field of Search ............... 99/467, 468, 470, 99/472–476, 483, 516, 517; 119/497, 496; 62/259.3, 371, 318, 331, 457.1; 165/46; 426/315, 410; 452/125, 187, 67, 128

[56] References Cited

U.S. PATENT DOCUMENTS

| | | | |
|---|---|---|---|
| 1,233,387 | 7/1917 | Morawski | 99/476 X |
| 1,971,460 | 8/1934 | McKee. | |
| 2,169,030 | 8/1939 | Robrahn | 119/496 |
| 2,246,229 | 6/1941 | Wohlmuth. | |
| 2,460,269 | 2/1949 | Appeldoorn. | |
| 2,518,651 | 8/1950 | Weiss et al.. | |
| 2,522,391 | 9/1950 | McGonigle | 119/497 |
| 3,674,188 | 7/1972 | Anderson. | |
| 4,053,963 | 10/1977 | Matheu | 452/67 |
| 4,110,916 | 9/1978 | Bemrose | 99/476 X |
| 4,317,257 | 3/1982 | Engel | 452/128 |
| 4,529,240 | 7/1985 | Engel | 452/187 X |
| 4,779,524 | 10/1988 | Wade | 99/476 |
| 4,785,766 | 11/1988 | Blalock, Jr. | 119/497 |
| 4,887,823 | 12/1989 | Hallett et al.. | |
| 5,007,336 | 4/1991 | Bernhardt et al. | 99/487 |
| 5,336,124 | 8/1994 | Garside. | |
| 5,456,164 | 10/1995 | Bang | 99/468 |
| 5,467,734 | 11/1995 | Ho | 119/497 |
| 5,503,107 | 4/1996 | Satcher et al. | 119/496 |

*Primary Examiner*—Timothy F. Simone
*Attorney, Agent, or Firm*—Everett G. Diederiks, Jr.

[57] ABSTRACT

A portable game animal storage unit, particularly adapted for use in storing, transporting and preserving game animals, is defined by an enclosure sized to house a harvested game animal. For instance, for deer hunting, the enclosure is designed to be approximately eight (8) feet tall, three (3) feet wide and two (2) feet deep. At least one of the panels is provided with a reclosable opening for accessing an internal cavity of the enclosure in order to place the harvested animal within the enclosure and to remove the animal therefrom. Various handles are provided externally of the enclosure for use in carrying the storage unit between desired locations. In accordance with one embodiment of the invention, the storage unit is defined by a pliable bag which can be refrigerated in order to maintain the meat of the animal within a desired temperature range for aging and preservation purposes. A fine screen mesh is used to form part of the bag when enhanced ventilation is desired. In a further embodiment, the storage unit takes the form of a cooler which is molded of plastic and includes a pivotable access door. In any case, the storage unit has attached thereto a supporting assembly which enables a game animal to be mounted within the storage unit, while also enabling the storage unit to be suspended from another support in a manner which prevents the weight of the animal from being borne by the enclosure defining structure of the storage unit itself.

20 Claims, 5 Drawing Sheets

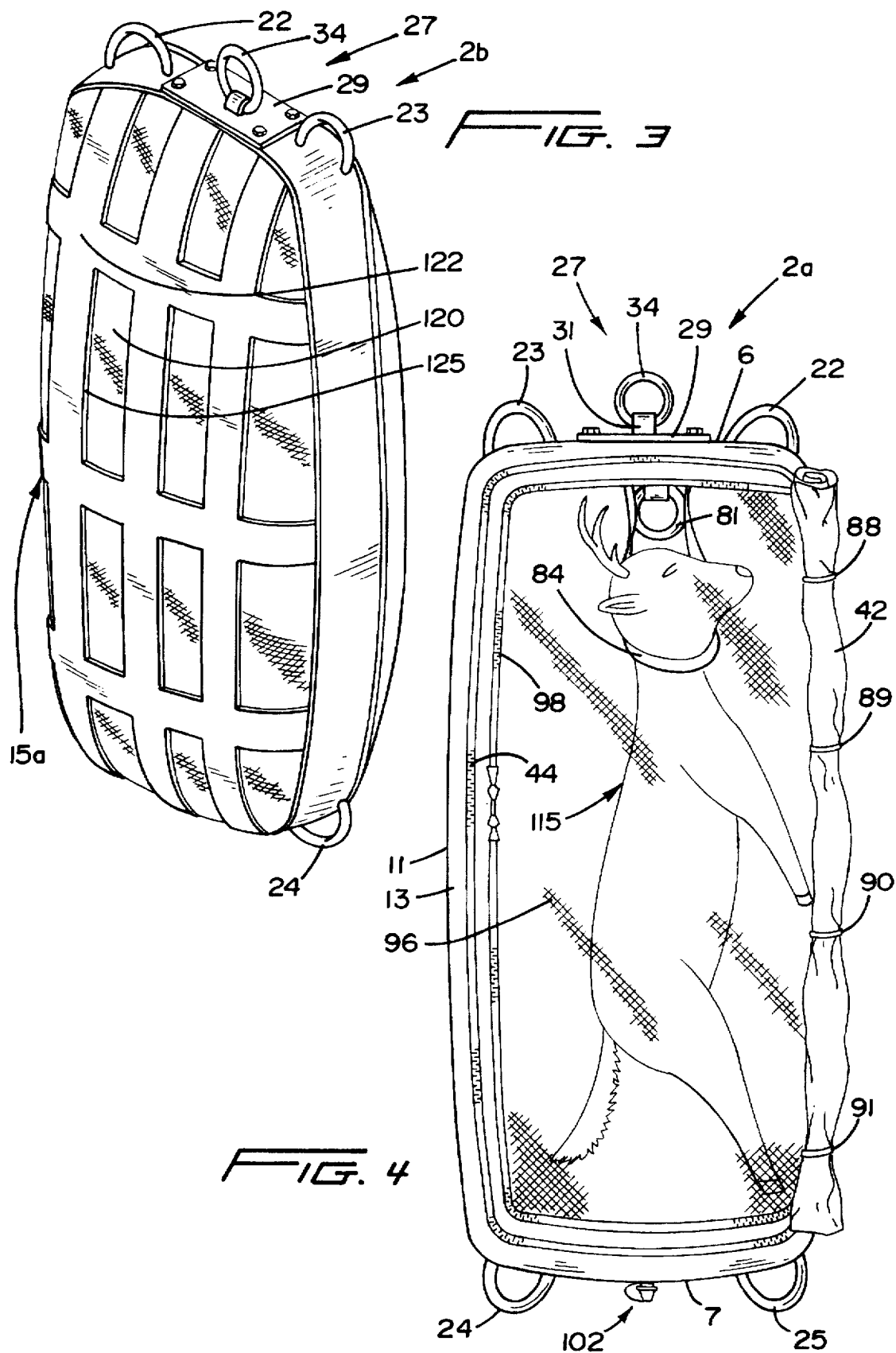

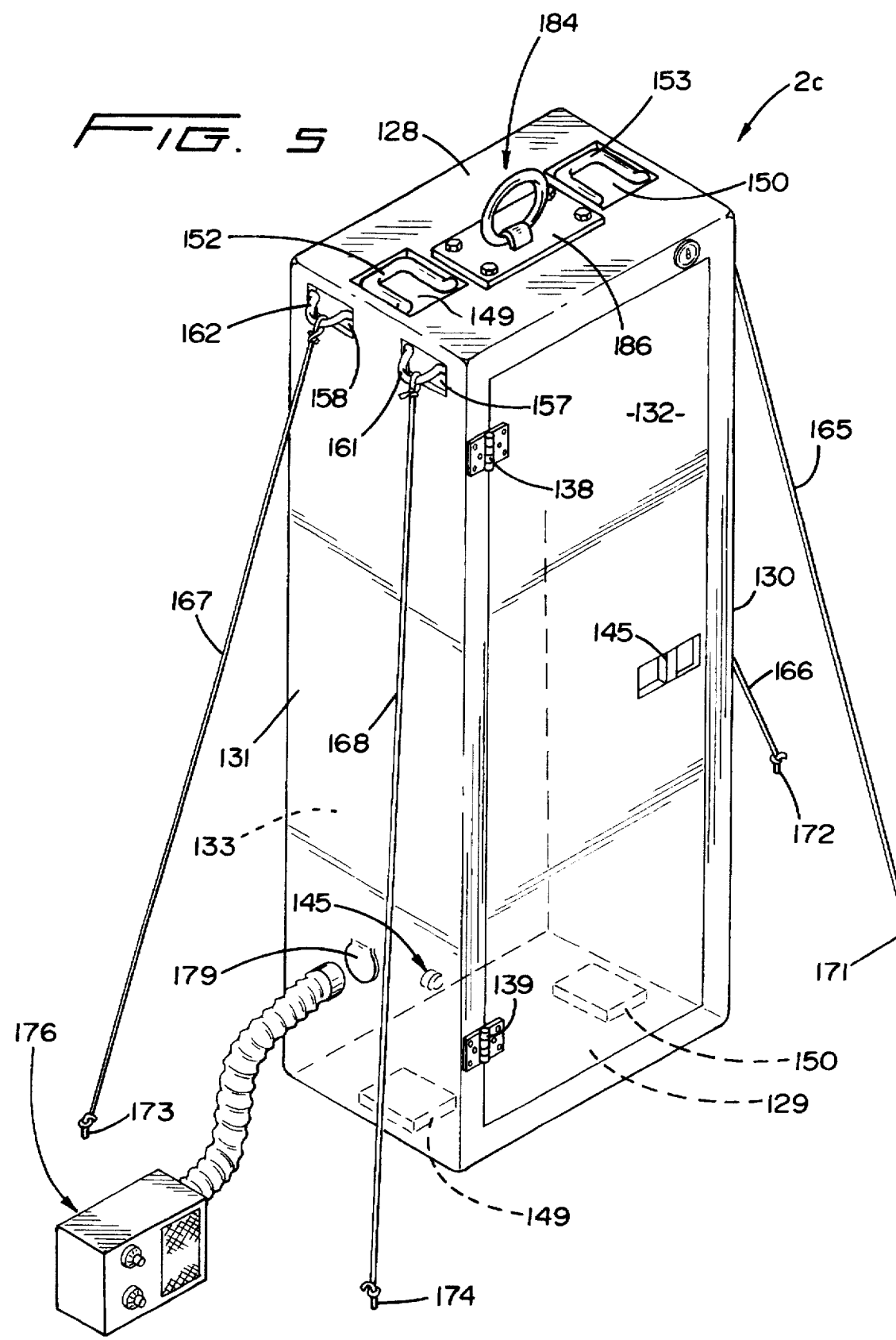

5,761,992

PORTABLE ANIMAL STORAGE UNIT

BACKGROUND OF THE INVENTION

1. Field of the Invention

The present invention pertains to the art of hunting and, more particularly, to a portable unit within which a successfully hunted game animal may be mounted for transportation and storage purposes after being harvested.

2. Discussion of the Prior Art

Hunting deer and other game has been, and continues to be, an extremely popular sport. Truly ethical sportsman hunt not only for a potential trophy, but also take care in preserving their prize for human consumption. Unfortunately, even the most avid hunter often encounters problems in protecting the meat from spoiling after the game has been harvested.

For example, deer hunting often takes place in areas remote from storage facilities which are adequate for protecting the game meat. Warm temperatures and insects, as well as wild and domestic animals, can quickly spoil the meat and hide of the animal, thereby destroying the trophy and making the meat unfit for consumption. Although it is rather common to apply liberal amounts of black pepper to the meat and wrap the animal body or carcass in cheese cloth to keep away flies, warm weather will really mandate that the animal body be placed in a cooler environment without delay in order to preserve the meat. Preferably, the harvested game will be hung for days and maintain at a temperature of approximately 38° to 40° to properly age the meat in order to enhance the flavor and tenderness thereof. Since ambient temperatures seldom allow for such ideal aging conditions, a hunter is usually required to transport the hunted animal to a refrigerated storage facility almost immediately following the harvest. Of course, this need to immediately preserve the usefulness of the animal materially detracts from the sport as a whole.

In addition to utilizing cheesecloth, other arrangements have been proposed, including game bags, screen houses and commercial refrigeration, for protecting the meat of the animal. Protecting the meat from insects, particularly blow flies which can smell and will attack the killed animal often in a manner of seconds, is of extreme importance since such flies can contaminate much of the carcass even within the short period of time of a couple hours. Although cheesecloth, game bags and screen houses do a pretty fair job of protecting the meat from insects, they do nothing to protect it from warm weather spoilage. In addition, commercial refrigeration is generally unavailable at remote hunting sites and, at the very least, is extremely inconvenient.

Therefore, there exists a need in the art for a portable unit that can be readily taken on a hunting trip and used for storing and transporting a successfully hunted game animal. More particularly, there is a need for a portable unit within which hunted game can be immediately placed following a kill in order to protect the harvested game from insects, other animals and the like. In addition, there is a need for a portable animal storage unit that is designed to enhance transporting the game from a hunting zone, or between other remote places. Furthermore, there exists a need for a portable animal storage unit that is adapted to maintain an animal body or carcass within a desired temperature range to thereby preserve the meat for an extended period of time.

SUMMARY OF THE INVENTION

The present invention is directed to an animal storage unit, particularly adapted for use in preserving successfully hunted deer or the like, which is portable in design such that it can be readily carried with a hunter to various remote locations. Immediately upon harvesting, the game animal can be mounted within the portable storage unit to preserve the carcass and to enable easy transporting of the game animal to different locations.

These and other objects of the present invention are accomplished by providing a portable animal storage unit formed by a pair of spaced end panels, a pair of spaced side panels, a front panel and a rear panel, all of which are interconnected to define an enclosure that is adequately sized to house the type of animal being hunted. For instance, for deer hunting, the enclosure is designed to be approximately eight (8) feet tall, three (3) feet wide and two (2) feet deep. At least one of the panels is provided with a reclosable opening for accessing an internal cavity of the enclosure in order to place the harvested animal within the enclosure and to remove the animal therefrom. Various handles are provided externally of the enclosure for use in carrying the storage unit between desired locations.

In accordance with one embodiment of the invention, the storage unit is defined by a pliable bag, preferably made of a water resistant nylon outer shell and a washable interior. A fine screen mesh is used to form part of the bag when enhanced ventilation is desired. In another embodiment, the portable animal storage unit is refrigerated in order to maintain the meat of the animal within a desired temperature range for aging and preservation purposes. In a still further embodiment, the storage unit takes the form of a cooler which is molded of plastic and includes a pivotable access door. In any case, the storage unit has attached thereto a supporting assembly which enables a game animal to be mounted within the storage unit, while also enabling the storage unit to be suspended from another support in a manner which prevents the weight of the animal from being borne by the enclosure defining structure of the storage unit itself. In this manner, the enclosure defining structure can be made of light-weight materials while still protecting and preserving the game. In accordance with another aspect of the invention, a portable refrigeration device is provided which can be integrally constructed with or removably attached to the storage unit in order to cool the interior thereof.

Further objects, features and advantages of the present invention will become more readily apparent from the following detailed description of preferred embodiments thereof when taken in conjunction with the drawings wherein like reference numerals refer to corresponding parts in the several views.

BRIEF DESCRIPTION OF THE DRAWINGS

FIG. 3 is a rear perspective view of a second embodiment of the invention.

FIG. 4 is a front view of the portable animal storage unit of the invention illustrating the manner in which a deer can be mounted therein.

FIG. 5 is a perspective view of a third embodiment of the portable animal storage unit of the invention.

DETAILED DESCRIPTION OF THE PREFERRED EMBODIMENTS

Figure 1:
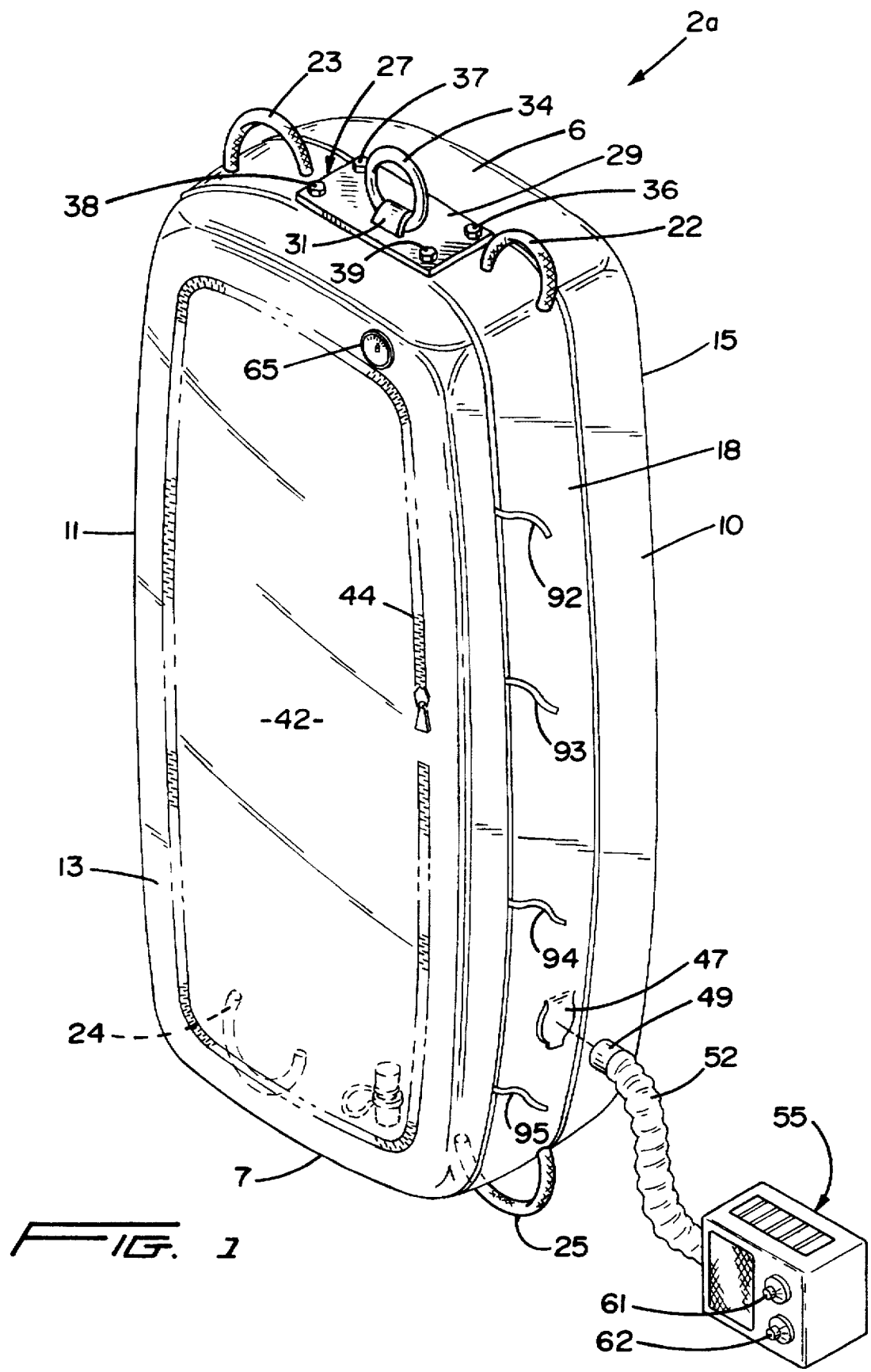
FIG. 1 is a perspective view of a first embodiment of the portable animal storage unit of the present invention.

With initial reference to FIG. 1, a portable animal storage unit constructed in accordance with a first preferred embodiment of the invention is generally indicated at 2a. Storage unit 2a includes a pair of longitudinally spaced end panels 6 and 7, a pair of longitudinally extending side panels 10 and 11, a front panel 13 and a rear panel 15. Panels 6, 7, 10, 11, 13 and 15 are interconnected, such as through a stitching operation, such that storage unit 2a defines an enclosure. A reinforcing strip 18 may extend annularly about storage unit 2a along end and side panels 6, 7, 10 and 11 as shown. In the embodiment depicted, storage unit 2a is sized to accommodate average deer size game and therefore end panels 6 and 7, as well as side panels 10 and 11, preferably have a depth of approximately two (2) feet, side panels 10 and 11, as well as front and rear panels 13 and 15, have a length of approximately eight (8) feet, and end panels 6 and 7, as well as front and rear panels 13 and 15, have an associated width of approximately three (3) feet. Of course, these dimensions are presented for exemplary purposes and other size units can be produced to accommodate a particular species of game or multiple game animals within a single unit.

To aid in manually transporting storage unit 2a, a plurality of handles 22–25 are provided. As shown, handles 22–25 are preferably mounted to end panels 6 and 7, adjacent each of side panels 10 and 11. Of course other locations for handles 22–25 would be within the scope of the present invention, such as placing handles 22–25 directly along side panels 10 and 11. Although handles 22–25 could be made of rigid materials such as plastic, in the preferred embodiment handles 22–25 are made out of rubber, rope, leather or similar flexible materials. At end panel 6, storage unit 2a is provided with a supporting unit generally indicated at 27. In the preferred embodiment depicted, supporting unit 27 includes an outer supporting member 29 in the form of a plate that is provided with an eyelet 31 to which is pivotally attached a loop-type connector 34. First plate 29 is attached at end panel 6 through a plurality of bolts 36–39 in the manner which will be more fully described below.

To provide access to an internal cavity defined within storage unit 2a, front panel 13 is shown provided with a flap 42 that can be selectively opened and closed through the use of a zipper 44. Of course, providing access to within storage unit 2a through flap 42 and zipper 44 is only presented as an exemplary embodiment and various other arrangements could be readily provided as will be evident to one of ordinary skill in this art. For example, snaps, buckles, hook and loop-type fasteners and the like could also be readily utilized. Storage unit 2a also has associated therewith an access port that can be selectively closed by means of a cover 47. Access port cover 47 preferably constitutes a spring biased member that can be selectively pivoted to an open position in order to receive an end connector 49 that is provided on a flexible duct 52 of a portable refrigeration unit 55. As the particular construction of the refrigeration unit 55 does not form part of the present invention and such portable refrigeration units are known, such as those utilized in connection with refrigerating space suits, the details of refrigeration unit 55 will not be presented here. However, it should be noted that refrigeration unit 55 provides for flow of cooling air within storage unit 2a in order to establish a desired temperature therein. The temperature within storage unit 2a can be controlled by adjusting dials 61 and 62 of refrigeration unit 55 and can be monitored through a thermometer 65 shown mounted at front panel 13. Actually, in the preferred embodiment, refrigeration unit 55 is thermostatically controlled to maintain a desired temperature within storage unit 2a in order to preserve a game animal mounted therein.

Figure 2:
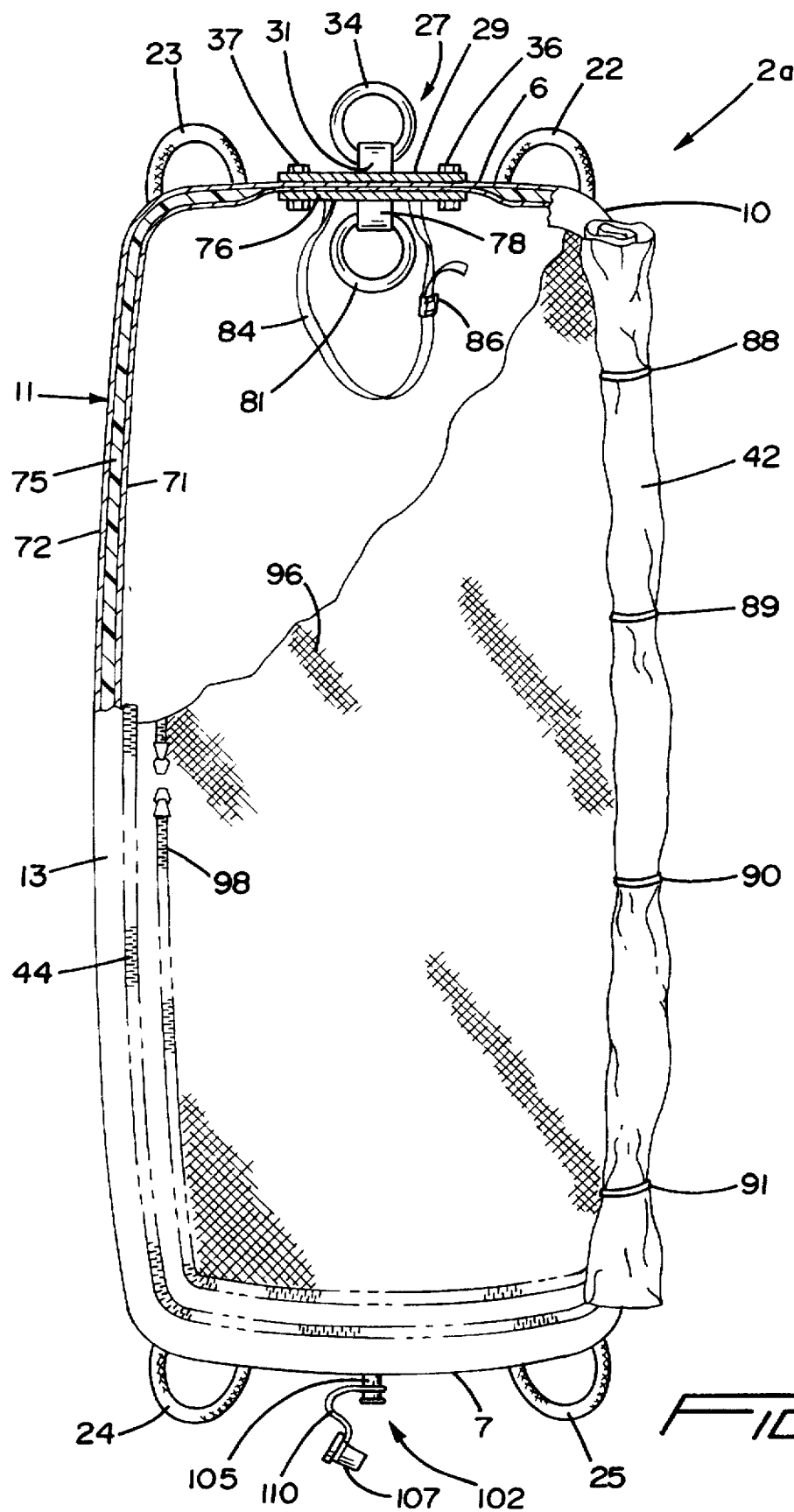
FIG. 2 is a front, partial cross-sectional view of the embodiment of FIG. 1 illustrating internal game animal mounting structure, as well as the potential for including an inner mesh liner and tie down structure for an outer liner.

With particular reference to FIG. 2, each of the panels 6, 7, 10, 11, 13 and 15 of storage unit 2a is preferably formed of an inner shell 71 and an outer shell 72, between which is situated a thermal insulation material 75. In the preferred embodiment, outer shell 72 is made of a water resistant nylon and inner shell 71 is made of a washable vinyl. Thermal insulation material 75 can be constituted by various materials including foam insulation. Of course, it should be readily apparent that storage unit 2a can actually be made of various materials for economical or other reasons without departing from the spirit of the invention. What is important to note is that storage unit 2a is formed of materials that are generally light weight such that the unit can be dragged by one or more people when loaded with one or more game animals or carried through the use of handles 22–25.

Supporting unit 27 also includes an inner supporting member shown in the form of a plate 76 that, in a manner directly analogous to outer plate 29, is preferably provided with an eyelet 78 to which is attached a loop-type connector 81. Inner plate 76 is secured to outer plate 29 through bolts 36–39, as well as nuts (not labeled) with end panel 6 being sandwiched therebetween as clearly shown in FIG. 2. A coating of silicon or other sealant may be applied between the outer and inner plates 29 and 76 and end panel 6. Supporting unit 27 also preferably includes some additional structure for suspending an animal body or carcass within storage unit 2a. In the preferred embodiment shown, this additional structure takes the form of an adjustable length strap 84 that is comprised of one or more strap members that are interconnected by buckle 86 or the like. Strap 84 can be fixed to inner plate 76 or can be secured to loop-type connector 81. What is important to note is that strap 84 is not directly supported from end panel 6 since as will become more fully evident below, it is preferred in accordance with the present invention to enable game to be suspended within storage unit 2a without transferring the weight of the game to panels 6, 7, 10, 13 and 15. The presence of loop-type connector 81 enables storage unit 2a to be more versatile and can be used to attach a gambrel, rope or other game supporting device (not shown).

When zipper 44 is opened, front flap 42 may be rolled to a stowed position adjacent side panel 10 and can be maintained in the stowed position through the use of inner and outer ties 88–95 (see both FIGS. 1 and 2). Storage unit 2a may also include an inner mesh panel 96 that is located below front flap 42. Inner mesh panel 96 can be similarly removed to provide access within storage unit 2a by means of a zipper 98 or the like. End panel 7 is preferably designed to form a trough which will enable fluids to run to a central area thereof. At this central area, a drain unit 102 is provided. Drain unit 102 therefore fluidly communicates the interior of storage unit 2a with the ambient surroundings and preferably is formed by a flexible tube 105 that projects a short distance away from the enclosure. Flexible tube 105 is adapted to be sealed by a plug 107 that is secured to the tube 105 through a strap 110. The plug and tube connection can take various forms including a simple friction fit or a threaded connection.

FIG. 4 depicts the manner in which a deer 115 can be hung within unit 2a for storage and transportation purposes. When refrigeration unit 55 is not provided, it may be desirable to open front flap 42 to enable the circulation of fresh air within storage unit 2a through inner mesh panel 96 as shown in FIG. 4. At this point, it should be realized that inner mesh panel 96 constitutes a screen, such as NO-SEE-UM meshing, fine enough to not only keep out blow flies but to also camouflage the contents of the bag. Such screen materials are known in the art such as for use in tents and the like. When the deer 115 is not being transported within storage unit 2a, the storage unit 2a can be laid on the ground or, preferably, suspended from an upper support such as a tree or the like through loop-type connector 34. When storage unit 2a is supported in this manner, it should be realized that the entire weight of the deer 115 will be borne by the upper support through supporting unit 27. Therefore, regardless of whether the deer 115 is suspended by adjustable length strap 84 as depicted or through a rope or the like that is secured to loop connector 81, the interconnection between inner plate 76 and outer plate 29 will prevent the transfer of the weight of the deer 115 to the panels 6, 7, 10, 11, 13 and 15 of storage unit 2a when storage unit 2a is vertically suspended through loop-type connector 34. This feature of the invention advantageously enables each of the panels 6, 7, 10, 11, 13 and 15 to be reduced in thickness and weight which correspondingly enhances the portability of storage unit 2a.

FIG. 3 depicts another embodiment of the invention which is adapted to be utilized when a portable animal storage unit 2b is desired that need not be refrigerated. In general, storage unit 2b is essentially identical in construction to storage unit 2a except, in accordance with this embodiment, a rear panel 15a is utilized that includes an inner mesh layer 120 and an outer, grid-like covering 122. With this arrangement, various openings 125 are provided to ventilate the storage unit 2b and the outer, grid-like covering 122 still enables the storage unit to be dragged along the ground without tearing inner mesh layer 120. Of course, it should be realized that the depicted size for openings 125 has been presented for exemplary purposes only and can be reduced or reconfigured within the scope of the invention. As shown, rear panel 15a can actually be curved at the top, bottom and sides thereof to form part of the top, bottom and side panels of the storage unit 2b.

FIG. 5 depicts a still further embodiment of the invention wherein a storage unit 2c generally takes the form of a cooler having end panels 128 and 129, side panels 130 and 131, front panel 132 and a rear panel 133. In this embodiment of the invention, end panels 128 and 129, side panels 130 and 131 and rear panel 133 are preferably integrally molded of plastic and front panel 132 generally constitutes a door that is interconnected to the remainder of the storage unit 2c by means of hinges 138 and 139. Actually, each of the panels 128–133 is preferably molded, such as through a thermoforming process, into a double-walled member in a manner similar to conventional food/beverage coolers. Although hinges 138 and 139 are shown in this figure to constitute conventional door-type hinges, it should be readily apparent that integrally molded plastic hinges in the form of straps could also be readily utilized in a manner also analogous to portable food/beverage coolers commonly known in the marketplace. Front panel 132 can therefore be pivoted between open and closed positions through hinges 138 and 139 and can be secured in the position shown in FIG. 5 by means of a latching unit 145. It should be noted that front panel 132 is preferably spaced from a lower supporting surface for the storage unit 2c to ease the opening thereof. In the manner directly analogous to the storage unit embodiments described above, storage unit 2c is preferably in the order of eight (8) feet in height, three (3) feet in width and two (2) feet in depth when designed to accommodate an average sized deer. Again, other sizes can be made in accordance with the present invention to accommodate the particular size game being transported and/or stored.

In further accordance with the embodiment of FIG. 5, end panel 129 and rear panel 133 preferably slope internally toward a juncture zone thereof and a drain unit 145 is provided in this zone. Therefore, any fluid coming from a game placed within the storage unit 2c will tend to flow towards drain unit 145. Each end panel 128 and 129 is shown formed with a pair of spaced recesses 149 and 150 within which are pivotally mounted handles 152 and 153. Mounting handles 152 and 153 in recesses 149 and 150 enables end panel 129 to be flat such that the storage unit 2c can be vertically supported on a ground surface in the manner shown in FIG. 5. In addition, side panels 130 and 131 are preferably provided with recesses 157 and 158 adjacent end panel 128. Each of the recesses 157 and 158 houses a respective pivotable tie-down connector 161 and 162. Therefore, with the generally outer planar surface of end panel 129 and the provision for tie-down connectors 161 and 162, storage unit 2c can be maintained in a secure, upright position by attaching an end of each rope 165–168 to a respective tie-down connector 161, 162 while the second end of each rope 165–168 is mounted to the ground through a respective stake 171–174. In a manner similar to the embodiment of FIG. 1 described above, a portable refrigeration unit 176 can be attached to storage unit 2c through a shiftable access port cover 179.

Figure 6:
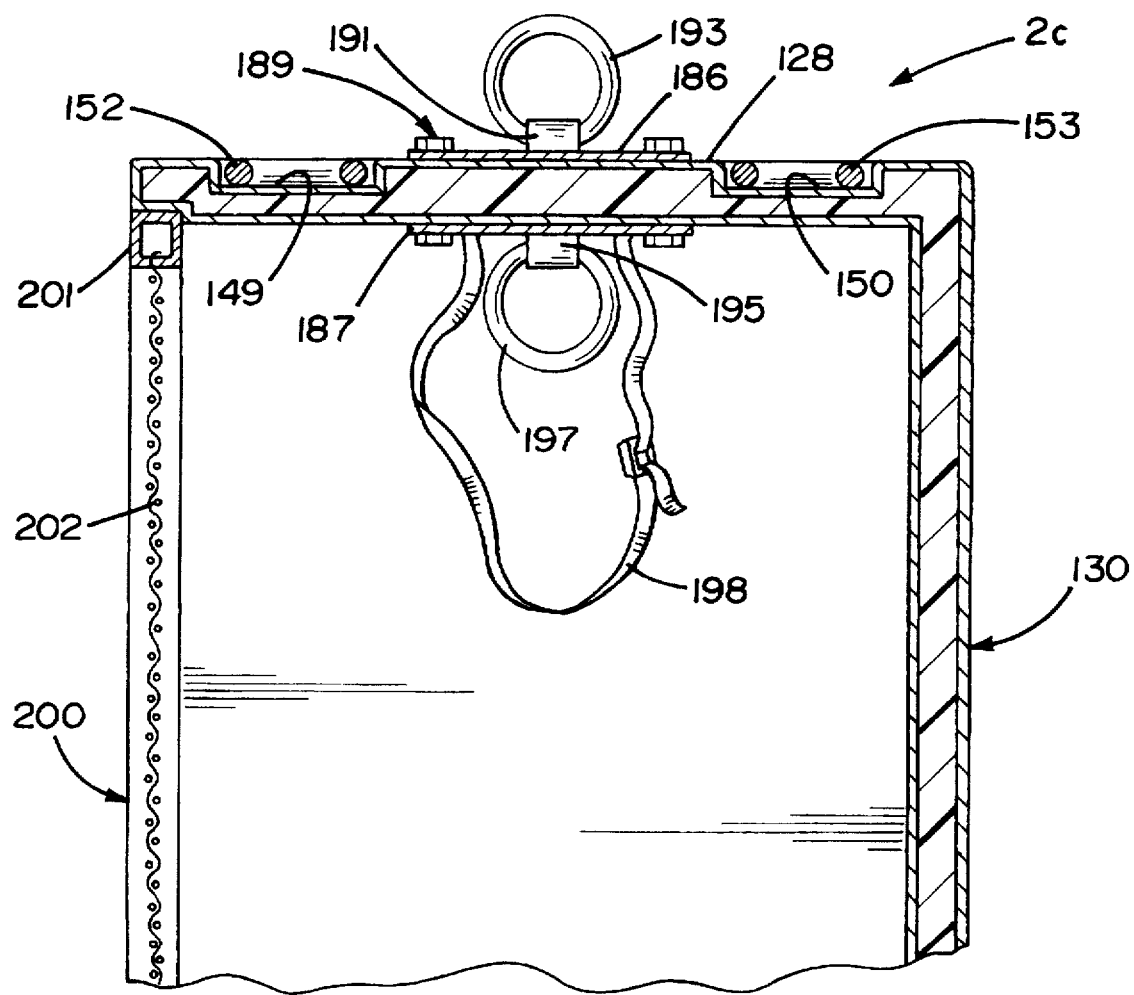
FIG. 6 is a partial cross-sectional view of an upper section of the storage unit of FIG. 5, but also illustrating further aspects of the invention.

With reference to FIGS. 5 and 6, the storage unit 2c of this embodiment further includes a supporting unit 184 that is preferably constructed in a manner directly analogous to supporting unit 27 described above. Therefore, supporting unit 184 includes an outer plate 186 and an inner plate 187 that are interconnected at end panel 128 through a plurality of nuts and bolts 189. Outer plate 186 includes an eyelet 191 for use in attaching a loop-type connector 193 thereto and inner plate 187 similarly includes an eyelet 195 for attaching loop-type connector 197. Obviously, storage unit 2c is much more structurally rigid in construction than that of the embodiments described above and therefore game can be suspended therein by means of an adjustable strap 198 or the like with the weight of the game being transferred to the storage unit 2c. However, storage unit 2c can also be vertically suspended through loop-type connector 193, in which case the weight of the game will not be transferred to the various panels 128–133.

FIG. 6 also illustrates another aspect of the present invention wherein side panel 131 is replaced by a removable side panel 200 that is formed by a peripheral tubular support 201 and a mesh screen 202. Removable side panel 200 can be selectively attached or detached from the remainder of the storage unit and is merely provided to enhance ventilation in circumstances wherein refrigeration unit 176 is not utilized. Of course, although mesh screen 202 is disclosed for replacing the side panel, other panels of the storage unit could equally be replaced or the walls could be formed with relatively slidable panel members for selectively ventilating the interior of the storage unit in a manner analogous to the construction of conventional screen door panels.

It should also be noted that the storage units in accordance with the present invention can also be refrigerated in ways other than providing one of units 55 or 176, such as by incorporating integrated, internally housed refrigeration units or simply placing ice therein. The refrigeration units themselves can be adapted to run off various power sources including 12 volt DC, 120 AC, solar energy, propane, etc. The 12V DC power source is preferred in that it would allow the refrigeration units to be advantageously operated while transporting the game in a vehicle. With the inclusion of the refrigeration aspect of the invention, a hunter could continue hunting for days while storing acquired game within the storage unit of the invention and then transporting the harvested game over rather long distances without worrying about the game being infested by insects or being subjected to damaging temperatures. The portable animal storage unit of the present invention can be particularly advantageously utilized by hunters who prefer to process the meat themselves since the storage unit enables the harvested game to be transported in a protected condition all the way from the site of the kill to a meat processing location.

Although described with respect to preferred embodiments of the invention, it should be readily understood that various changes and/or modifications can be made to the invention without departing from the spirit thereof. For example, the particular materials mentioned for producing the storage unit embodiments described above should be considered representative only and other materials can be utilized, including soley a meshing material, insulated mylar and the like. Also, numerous other arrangements for supporting game within any one of various storage unit embodiments described could be employed while still preventing the transfer of the weight of the game to the storage units in accordance with the invention. Additional features can also be provided such as equipping the storage units with lights. Furthermore, it should be recognized that the storage units can be advantageously used for other purposes, such as storing other items when traveling to or from a hunting sight. Finally, it should be realized that the use of terms such as "front", "rear" and "side" panels do not inherently refer to separate elements of the storage unit in the sense that even a single piece of material could be used to form the storage unit. Therefore, the storage unit of the invention could simply be formed from opposing panels joined together about a peripheral seam, which panels will inherently define front, rear and side panels when a game animal is mounted therein. With this in mind, the invention is only intended to be limited by the scope of the following claims.

I claim:

1. A portable animal storage unit comprising:
   a pair of spaced end panels, a pair of spaced side panels, a front panel and a rear panel, each of the end and side panels having an associated depth of at least one foot, the end, side, front and rear panels being interconnected at peripheral portions thereof so as to define an enclosure having an internal cavity, at least one of the end, side, front and rear panels including a reclosable opening for accessing the interior cavity of the enclosure; and
   a supporting unit including an inner support member attached to the enclosure at one of the end panels, within the internal cavity of the enclosure, from which an animal is adapted to be mounted when housed in the storage unit.

2. The portable animal storage unit according to claim 1, wherein the supporting unit includes an outer supporting member that is connected to the inner supporting member with said one of the end panels being sandwiched therebetween wherein, when a game animal is mounted from the inner support member and the storage unit is suspended from the outer supporting member, a weight of the game animal will not be borne by the enclosure.

3. The portable animal storage unit according to claim 2, wherein the supporting unit further includes a strap member attached to the inner supporting member within the internal cavity of the enclosure for use in suspending an animal therein.

4. The portable animal storage unit according to claim 2, wherein the supporting unit further includes inner and outer connectors attached to the inner and outer supporting members respectively.

5. The portable animal storage unit according to claim 1, further comprising: a plurality of handles attached at spaced peripheral portions to the enclosure.

6. The portable animal storage unit according to claim 5, wherein each of said handles is secured to a respective one of the end panels of the storage unit.

7. The portable animal storage unit according to claim 1, further comprising: a drainage member extending through one of the end, side, front and rear panels for fluidly communicating the internal cavity with an ambient surrounding.

8. The portable animal storage unit according to claim 1, further comprising: means for attaching a refrigeration unit to said storage unit, said attaching means including an access port extending through one of the end, side, front and rear panels and a cover member for selectively closing the access port.

9. The portable animal storage unit according to claim 8, further comprising, in combination: a portable refrigeration unit including a tubular end connector adapted to be interconnected to the enclosure through said attaching means.

10. The portable animal storage unit according to claim 1, further comprising: a temperature sensing unit, affixed to one of the end, side, front and rear panels, for providing a visual indication of the temperature within the enclosure.

11. The portable animal storage unit according to claim 1, wherein at least the end and side panels of the enclosure comprise inner and outer shell defining layers.

12. The portable animal storage unit according to claim 11, further comprising thermal insulation provided between the inner and outer shell defining layers.

13. The portable animal storage unit according to claim 1, wherein each of the end and side panels has an associated depth of approximately two feet, each of the side, front and rear panels has an associated length of approximately eight feet, and each of the end, front and rear panels has an associated width of approximately three feet.

14. The portable animal storage unit according to claim 1, wherein the front panel includes a flap portion that defines the reclosable opening, with the flap portion being formed of a pliable material, said storage unit further including a plurality of ties for selectively securing the flap portion in an open position.

15. The portable animal storage unit according to claim 1, wherein at least one of the end, side, front and rear panels is formed from a finely meshed material.

16. The portable animal storage unit according to claim 15, wherein the finely meshed material is used to form the rear panel and the rear panel further includes an outer, grid-like covering that is provided with a plurality of openings which expose the finely meshed material.

17. The portable animal storage unit according to claim 1, wherein at least a substantial portion of one of the end, side, front and rear panels is removably attached to a remainder of the enclosure.

18. The portable animal storage unit according to claim 1, wherein at least the end and side panels are formed as a single piece.

19. The portable animal storage unit according to claim 1, wherein the front panel comprises a door which is hingedly attached to a remainder of the enclosure.

20. The portable animal storage unit according to claim 1, further comprising: tie-down elements attached to each of the side panels, adjacent one of the end panels.

* * * * *